(12) United States Patent
Kencl et al.

(10) Patent No.: US 7,747,078 B2
(45) Date of Patent: Jun. 29, 2010

(54) SUBSTRING DETECTION SYSTEM AND METHOD

(75) Inventors: Lukas Kencl, Cambridge (GB); Gianluca Iannaccone, Cambridge (GB); Ramaswamy Ramaswamy, Amherst, MA (US)

(73) Assignee: Intel Corporation, Santa Clara, CA (US)

( * ) Notice: Subject to any disclaimer, the term of this patent is extended or adjusted under 35 U.S.C. 154(b) by 995 days.

(21) Appl. No.: 11/481,685

(22) Filed: Jul. 6, 2006

(65) Prior Publication Data

US 2008/0010278 A1    Jan. 10, 2008

(51) Int. Cl.
  *G06K 9/00* (2006.01)
  *G06K 9/36* (2006.01)
  *G06F 7/00* (2006.01)
  *G06F 17/30* (2006.01)

(52) U.S. Cl. .................. 382/181; 382/124; 382/232; 707/6; 707/E17.039

(58) Field of Classification Search ................ 382/181, 382/232, 124, 125; 707/6, 7, 4, E17.039, 707/3, 5, 102, 101, 100; 341/51, 87, 106; 726/25; 714/6; 702/1, 19; 713/188
See application file for complete search history.

(56) References Cited

U.S. PATENT DOCUMENTS

| | | | | |
|---|---|---|---|---|
| 6,012,049 | A * | 1/2000 | Kawan | 705/41 |
| 6,493,709 | B1 * | 12/2002 | Aiken | 707/4 |
| 6,611,213 | B1 * | 8/2003 | Bentley et al. | 341/51 |
| 6,804,316 | B1 * | 10/2004 | Shectman | 375/368 |
| 7,110,540 | B2 * | 9/2006 | Rajagopal et al. | 380/44 |
| 7,430,670 | B1 * | 9/2008 | Horning et al. | 713/190 |
| 7,454,418 | B1 * | 11/2008 | Wang | 707/6 |
| 7,487,542 | B2 * | 2/2009 | Boulanger et al. | 726/23 |

OTHER PUBLICATIONS

PCI Express Base Specification Revision 1.0, Jul. 22, 2002, 428 pgs.

* cited by examiner

*Primary Examiner*—Sheela C Chawan
(74) *Attorney, Agent, or Firm*—Grossman, Tucker, Perreault & Pfleger, PLLC

(57) ABSTRACT

A method, computer program product, apparatus, and system that detects a substring in an input data string by producing a fingerprint of a portion of the data string and comparing the fingerprint of the portion of the data string to at least one predefined fingerprint. The predefined fingerprint may be a fingerprint of a portion of a predefined pattern of interest. If the fingerprints match, further pattern recognition processing may be performed on the input string.

22 Claims, 6 Drawing Sheets

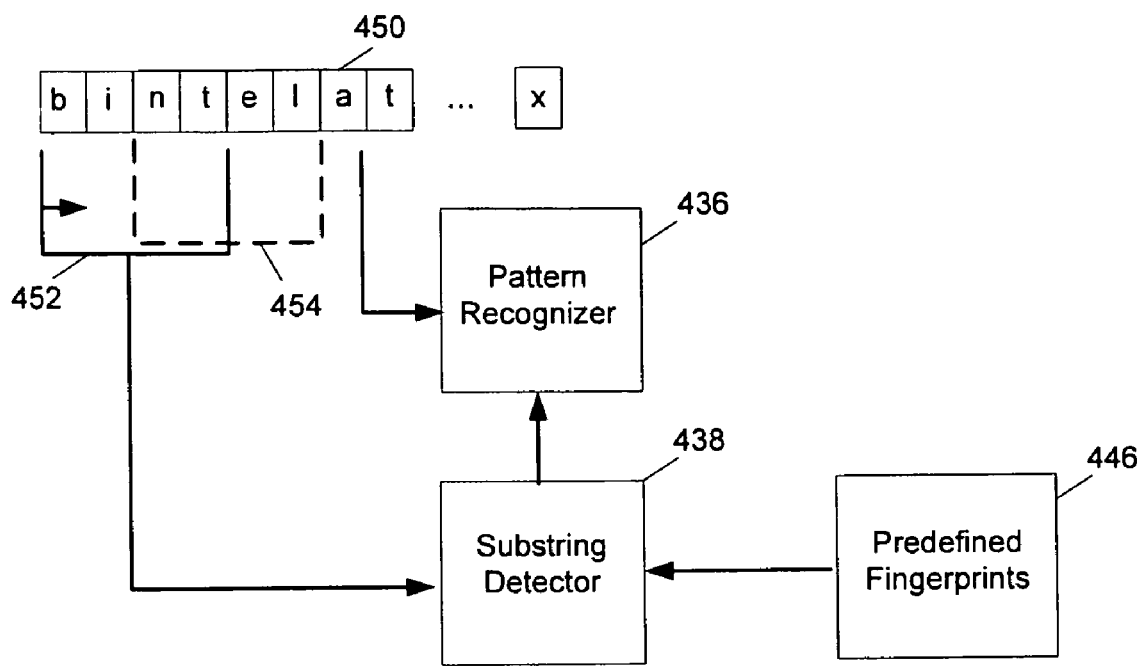
FIG. 4
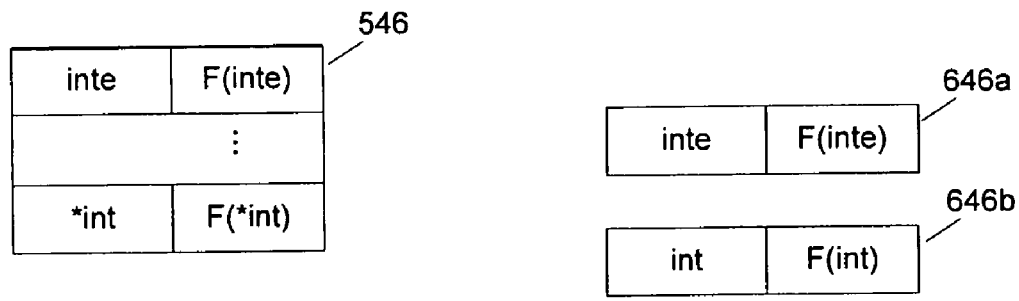
FIG. 5
FIG. 6

US 7,747,078 B2

SUBSTRING DETECTION SYSTEM AND METHOD

TECHNICAL FIELD

This disclosure relates to pattern recognition and, more particularly, to substring detection for use in a pattern recognition system and method.

BACKGROUND

In some applications and systems, such as networking systems, it is desirable to recognize the appearance of particular data. For example, network security systems, such as firewalls or intrusion detection systems, may use pattern matching to recognize certain data strings received by the systems. Viruses and/or other types of unwanted data, for example, may be recognized for network protection. Pattern matching may also be used for other purposes, such as network monitoring or biological pattern matching (e.g., particular portions of a deoxyribonucleic acid (DNA) sequence may be of interest for medical research). To detect the appearance of desirable or undesirable data, one or more predefined data patterns may be compared to the data under study. If one or more of the predefined data patterns matches a portion of the data under study, appropriate action may be executed. If a pattern representative of a computer virus is detected, for example, the data that contains the virus may be removed to reduce infection. Existing multiple pattern matching algorithms are complex and may use relatively large memory footprints and a significant amount of time to perform multiple pattern matching on data strings.

BRIEF DESCRIPTION OF THE DRAWINGS

The details of one or more implementations of this disclosure are set forth in the accompanying drawings and the description below. Other features and advantages will become apparent from the description, the drawings, and the claims.

FIG. 4 is a diagrammatic view of another embodiment of substring detection using a sliding window that slides by more than one character;

FIG. 5 is a diagrammatic view of one embodiment of a table of predefined fingerprints for use in substring detection with a sliding window that slides by more than one character;

FIG. 6 is a diagrammatic view of another embodiment of tables of predefined fingerprints for use in substring detection with a sliding window that slides by more than one character;

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims

DETAILED DESCRIPTION OF THE PREFERRED EMBODIMENTS

Figure 1:
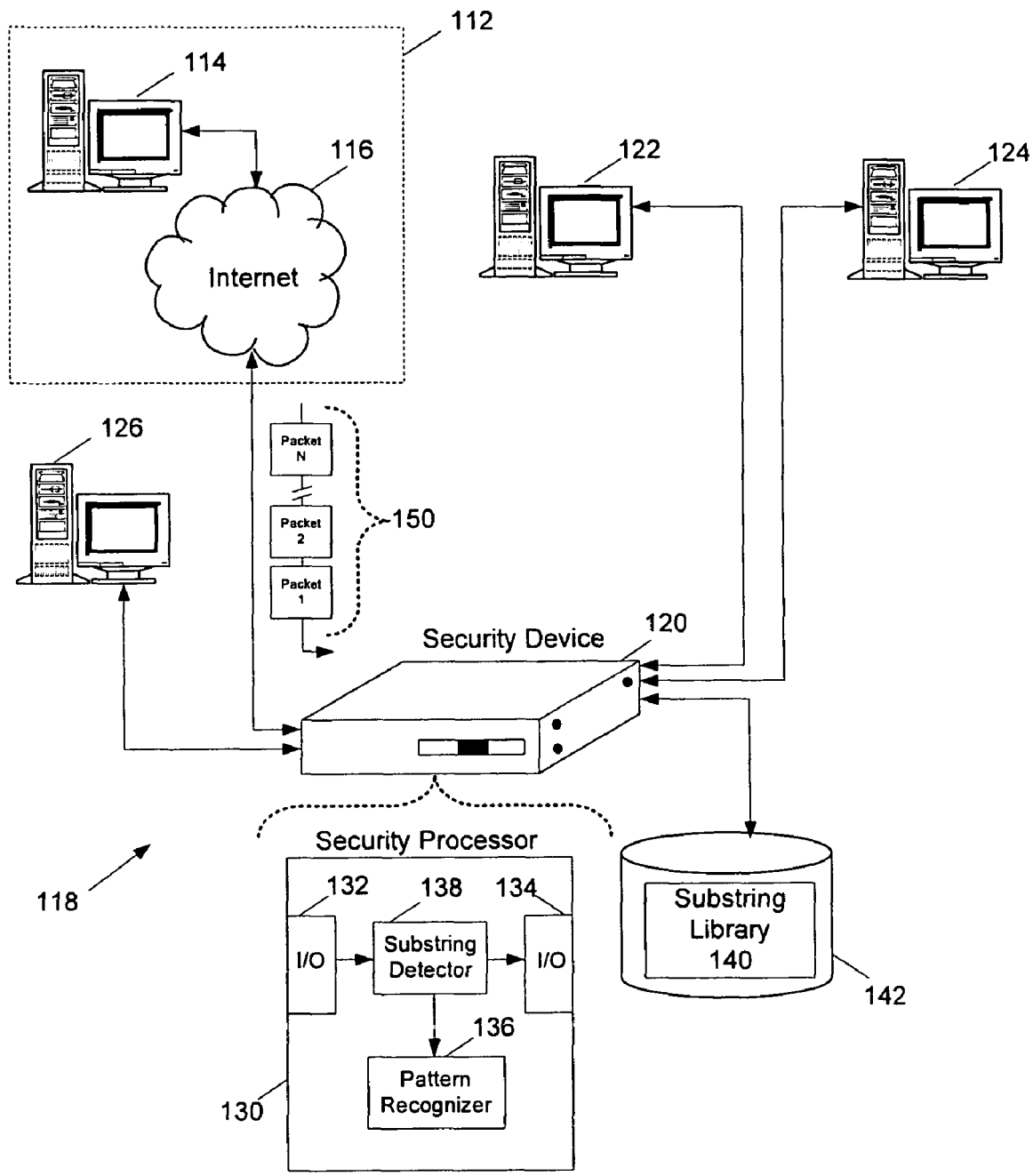
FIG. 1 is a diagrammatic view of a security system that monitors packet data for data patterns.

Referring to FIG. 1, a system 100 for transmitting data packets may include an external network 112 that may include a computer system 114 and the Internet 116. For illustrative purposes a single computer system (i.e., computer system 114) is included in external network 112, however, two or more computer systems and/or other network devices (e.g., routers, switches, etc.) and networks (e.g., local area networks (LAN), wide area networks (WAN), etc.) may be included in external network 12.

In this embodiment, system 100 may include an internal network 118 that may include computer systems, network devices, and networks that are separate from external network 112. For example, internal network 118 may represent a network used by an entity such as a business, an educational institution, and the like. Internal network 118 may include a security device 120 (e.g., a switch, a router, a computer system, etc.) that provides a level of security (e.g., enforces security policies) to the internal network 118. For example, security device 120 may monitor inbound (and outbound) data for viruses and/or other types of undesirable data. By monitoring inbound data packet traffic, network security device 120 may reduce the probability of a virus (or other type of undesirable data) from being received at computer system 122, computer system 124 and/or computer system 126 (or other type of device connected within internal network 118).

To enforce security policies, security device 120 may include a security processor 130 that may be tasked to monitor the content of inbound data packets. Security processor 130 may include one input/output (I/O) port 132 for receiving inbound data packets and another I/O port 134 for appropriately passing inbound data packets within internal network 118 (e.g., passing packets to computer system 122). Security processor 130 may be implemented as a single processor or multiple processors. For example, security processor 130 may include one or more general processors (e.g., a microprocessor) and/or one or more specialized devices (e.g., a co-processor or an application specific integrated circuit (ASIC)). In some embodiments security processor 130 may be implemented as a monolithic structure (e.g., a single integrated circuit), or, in other embodiments, as a distributed structure. Although the exemplary embodiment shows the security processor 130 in the security device 120, a processor or device capable of the functions described herein may be used in any type of computing device including, but not limited to, desktop computers, laptop computers, mobile phones, handheld devices, and the like.

For illustrative purposes, security device 120 may receive a series of data packets 150. For example, computer system 114 may initiate sending data packet series 150 to computer system 122 via the Internet 116. Prior to being delivered to computer system 122, security device 120 may check data packet series 150 for a certain type of data such as viruses or other types of undesirable data. In some embodiments, security device 120 may be part of an intrusion detection system such as the open source network intrusion detection system available under the name Snorts.

Security processor 130 may include a pattern recognizer 136 for recognizing the data. In some embodiments, pattern recognizer 136 may be implemented in hardware, in software, or a combination thereof. Further, pattern recognizer 136 may implement one or more pattern recognition algorithms for checking data packet content of data packet series 150. One such pattern recognition algorithm is a multi-pattern matching algorithm known to those of ordinary skill in the art, such as the type used in Snort® intrusion detection systems, for determining if portions of the data packets match multiple patterns of interest. Such pattern recognition algorithms may use a considerable amount of time to check the content of all of the data in a data packet series 150. As other data packet series are received by security device 120, the amount of time needed for checking packet content may become significant. In aggregate, the delays may cause a transmission bottleneck to appear at security device 120 that may reduce throughput of the device.

To reduce the time needed to check data packet content (e.g., the contents of data packet series 150), security processor 130 may include a substring detector 138. Substring detector 138 provides a preliminary check on data packet content. To provide this check, substring detector 138 attempts to detect if one or more predefined substrings may be present in the data packet content. As illustrated below, each predefined substring may be a substring (e.g., a prefix) of one or more predefined patterns of interest. By detecting one or more predefined substrings in the data packet content, substring detector 138 may identify one or more suspect data packets that may contain a pattern of interest (e.g., a virus or other type of undesirable data). Upon detecting one or more predefined substrings in a suspect data packet, the suspect data packet may be provided to pattern recognizer 136 to perform further pattern recognition of the data packet contents, for example, using multi-pattern matching. If a substring is not detected, the data packet may be eliminated from further pattern recognition processing and passed on to its destination. Alternatively, a data packet may be placed aside for further pattern recognition processing (e.g., by pattern recognizer 136) at a later time. By identifying suspect data packets based upon one or more predefined substrings of predefined patterns of interest, pattern recognizer 136 may be more efficiently executed for recognizing the patterns of interest in the data packets. Thus, the probability of bottlenecking may be reduced and throughput may be increased.

In this embodiment, the predefined substrings used by substring detector 138 may be included in a substring library 140 that may be stored on a storage device 142. Storage device 142 may implement one or more storage techniques (e.g., magnetic, magneto-optical disks, or optical disks, etc.) and be accessible by security device 120. By being accessible by security device 120, predefined substrings stored in substring library 140 may be provided to substring detector 138. Other data may also be stored on storage device 142. For example, data representative of instructions executed by security processor 130 to perform the operations of substring detector 138, pattern recognizer 136, and/or I/O ports 132, 134 may be stored in one or more files on storage device 142. Along with storing substrings, data representative of the patterns of interest and/or fingerprints of substrings as described below, may also be stored in substring library 140.

Figure 2:
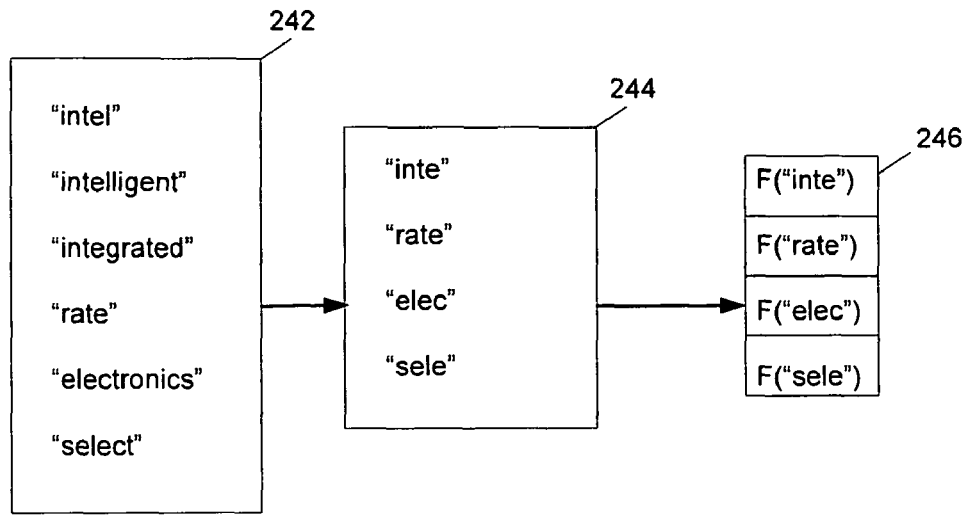
FIG. 2 is a diagrammatic view of one embodiment of composing predefined fingerprints for use in substring detection.

Referring to FIG. 2, predefined substrings 244 may be produced from a plurality of patterns of interest 242. For illustrative purposes, the patterns of interest 242 are shown as a list of desired terms and the predefined substrings 244 are shown as a list of substrings produced from those terms. In this example, each of the substrings 244 corresponds to a prefix including the first four characters of an entry in the patterns of interest 242. However, in other embodiments the substring may include any portion of the pattern of interest and may include more or less characters (e.g., two characters, six characters, etc.). Rather than repeat a substring, predefined substrings 244 may include one entry for identical substrings. Where both the patterns of interest "intel" and "intelligent" start with the same four character substring (i.e., "inte"), for example, the predefined substrings 244 may include one entry of "inte".

In the illustrated embodiment, the patterns of interest 242 and the substrings 244 are formed by ASCII characters. However, other types of data may be used to produce substrings for searching the contents of data packets. For example, numerical data (e.g., binary numbers, decimal numbers, hexadecimal numbers, etc.), graphical data, and the like may be used to produce substrings and to search packet content.

In some embodiments, the predefined substrings of the patterns of interest may be processed to produce a plurality of predefined fingerprints 246 prior to being used for searching packet content. In this embodiment, a fingerprint may be computed for each of the pattern substrings 244 obtained for the patterns of interest 242. In general, fingerprinting is an algorithmic operation that may transform a pattern of one length (W) into a pattern of a shorter length (F), wherein F<W. While the fingerprint of a substring may have a shorter length, the computed fingerprint has a relatively small probability of matching the fingerprint computed for a different substring (known as collision avoidance). Storing smaller sized fingerprints may conserve storage space in comparison to storing the entire substrings. Fingerprinting techniques known to those skilled in the art may be used to compute the predefined fingerprints. One example of a known fingerprinting technique that may be used is fingerprinting by random polynomials. According to this technique, randomly chosen irreducible polynomials may be used to fingerprint bit-strings. Such a technique is described in greater detail in "Fingerprinting by Random Polynomials", M. Rabin, Technical Report TR-15-81, Harvard University, Department of Computer Science, 1981.

The computed fingerprints 246 of the substrings 244 may be stored, for example, in a lookup table. A substring table may be stored in a memory (e.g., volatile, nonvolatile, etc.) such that entries of the table may be accessed by security processor 130 and compared to the fingerprints computed for the content of one or more data packets. For example, the memory may include random access memory (RAM), read-only memory (ROM), static RAM (SRAM), and/or other type or volatile or nonvolatile memory. Other data structures may also be used to store the predefined fingerprints. Predefined fingerprints may also be stored in a substring library (e.g. substring library 140 in storage device 142 shown FIG. 1). Although the illustrated embodiment shows predefined fingerprints 246 for substrings 244 associated with one group of patterns of interest 242, a substring library may include predefined fingerprints for multiple groups of patterns of interest.

Figure 3:
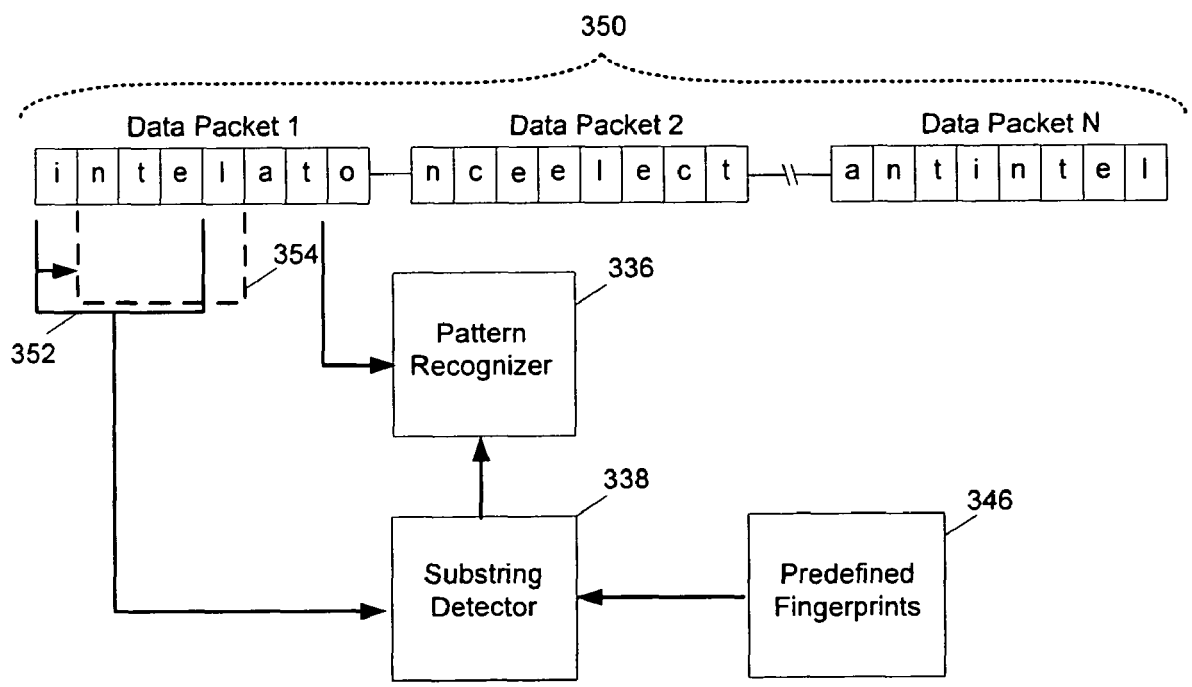
FIG. 3 is a diagrammatic view of one embodiment of substring detection in data packets using a sliding window across an input string.

Referring to FIG. 3, one embodiment of substring detection in an input data string is illustrated. In the illustrated embodiment, the input string includes contents of a data packet series 350, for example, the packet payload. In particular, data packet 1 contains a string "intelato" while data packet 2 contains a string "nceelect" and data packet N contains a string "antintel". To determine if one or more of the substrings associated with patterns of interest (e.g., substrings 244 in FIG. 2) match the packet content, substring detector 338 may compute fingerprints for one or more portions of the input string (e.g., the packet content) and may compare the computed fingerprints to the predefined fingerprints 346 (e.g., to the entries in a lookup table). In one embodiment, a portion of the input string indicated by bracket

352 may be read to compute a fingerprint. The number of characters in the portion of the input string, as indicated by bracket 352, may match the number of characters included in each predefined substring for a valid comparison of fingerprints. In the illustrated embodiment, for example, the portion of the input string includes four characters in the data packet 1 (e.g., "inte"), and each of the substrings (e.g., substrings 244) used to compute the predefined fingerprints 346 includes four characters.

In other embodiments, however, the size of the substrings and portions of the input string may include more or less characters (e.g., two characters, six characters, etc.). In other embodiments, a substring detection operation may read portions of different sizes from the input string depending on the size of the predefined substrings. For example, four character string portions may be read from a data packet (and corresponding fingerprints computed) for comparing with predefined fingerprints computed from four character predefined substrings. Six character portions may also be read from a data packet (and corresponding fingerprints computed) for comparing with predefined fingerprints computed from six character predefined substrings.

In one embodiment, data packet 1 may be examined for substrings and data packets 2 and N may then be sequentially examined for the substrings. In other embodiments, one or more data packets may be skipped. For example, after examining data packet 1, data packet 2 may be skipped and data packet N may be examined. The contents of data packet 2 may or may not be examined at a later time. In another embodiment, two or more of the data packets may be examined in parallel. For example, data packets 1, 2 and 3 may be examined simultaneously to reduce processing time.

The input strings (e.g., data packets) examined may also be of variable length. For example, the data packets may be capable of storing more or less than the eight characters stored in each of data packets 1, 2 and N. In other embodiments, input strings may be provided as a relatively continuous stream of characters and may not be segmented into packets. In still another embodiment, input strings may be included in a stream of fixed or variable length packets.

Substring detector 338 may compute a fingerprint of the portion of the input string and may compare the computed fingerprint to the predefined fingerprints 346. For example, the fingerprint of the portion "inte" may be compared to each of the fingerprints F("inte"), F("rate"), F("elec"), F("sele"). If a match is detected, data packet 1 may be provided to pattern recognizer 336 for executing further pattern recognition on the contents of the packet. In this particular example, a match may be detected since the fingerprint of "inte" is present in the predefined fingerprints F("inte"), F("rate"), F("elec"), F("sele"). If no match is detected in the substring of the data packet, another portion indicated by bracket 354 may be accessed, for example, the next four character portion (e.g., "ntel"). The substring detector 338 may then compute a fingerprint for this next portion of the input string and may compare this next computed fingerprint to the predefined fingerprints 346.

This process may be repeated for an entire data string (e.g., data packet 1) by sliding across the data string a window of a fixed size (e.g., represented by brackets 352, 354) corresponding to the size of the predefined substrings (e.g., a four character sliding window is shown). In this embodiment, a window of a fixed size is slid across the data string by one character at a time such that fingerprints are computed for successive fixed-length portions of the input string and compared to the predefined fingerprints. In the exemplary embodiment where the input string is a data packet, the fixed size of the window may correspond to a fixed number of bytes in a packet payload and the window may slide by one byte at a time.

Referring to FIGS. 4-6, a sliding window of a fixed size may also be slid across an input string by more than one character at a time. The fixed size (W) of the window may be greater than the slide (S), where W>S>1. In FIG. 4, for example, a four character sliding window (W=4) is sliding across an input string 450 (e.g., "bintelat . . . x") with a slide of two characters (S=2). Bracket 452 indicates a first position of the window relative to the input string 450 and bracket 454 represents a second position of the window relative to the input string 450. As mentioned above, a fingerprinting operation may be performed over the window contents as the window slides across the input string. In an exemplary embodiment where the input string 450 is a packet payload, the fixed window size (W) and the slide (S) may be a number of bytes (e.g., W=4 bytes and S=2 bytes). By sliding the window by more than one character, the substring detection process may be accelerated.

When the window is sliding by more than one character at a time, the predefined fingerprints 446 may include fingerprints of portions of the substrings in addition to fingerprints of the entire substrings. Comparing the computed fingerprints to fingerprints of portions of the substring prevents patterns from being missed when sliding the window by more than one character.

As shown in FIG. 5, for example, a predefined fingerprint table 546 may be populated with fingerprints of the substrings (e.g., F(inte)) and fingerprints of augmented portions of the substrings (e.g., F(*int)). Augmented portions of the substrings include a portion of the substring combined with other possible characters that may be used in an input string. In an embodiment where ASCII characters are used, for example, the portion of the substring (e.g., "int") may be combined with each of the ASCII characters to form augmented portions (e.g., "*int" where * denotes each of the possible 256 ASCII characters). In the illustrated embodiment where the characters are characters in the alphabet, the augmented portions of the substring "inte" may include "aint," "bint," "cint," "dint," . . . "zint."

The number of additional characters to be combined with substring portions to form augmented substring portions depends on the slide (S) of the window having the fixed length (W). In particular, the augmented substring portions may include one to S−1 upfront characters combined with the appropriately shortened substring. Where the slide (S) is two (2) characters, therefore, the augmented substring portions include substring portions with only one (1) upfront character (e.g., "*int" where * represents a character). If the slide (S) is three (3) characters, the augmented substring portions may include substring portions with one (1) additional character (e.g., "*int") and substring portions with two (2) additional characters (e.g., "*#in" where * and # represent any possible character). If the slide (S) is four (4) characters, the augmented substring portions may include substring portions with one (1) additional character (e.g., "*int"), substring portions with two (2) additional characters (e.g., "*#in"), and substring portions with three (3) additional characters (e.g., "*#$i" where *, # and $ represent any possible character). The predefined fingerprint table 546 may thus be populated by performing a fingerprinting operation over the predefined substrings of each pattern and over the possible augmented portions and storing the results in a lookup table.

During substring detection, computed fingerprints of portions of the input string 450 corresponding to the sliding window may be compared to each of the predefined fingerprints of substrings and predefined fingerprints of augmented substrings. As shown in FIG. 4, the sliding window indicated by bracket 452 contains the string portion "bint" and after sliding two characters, the sliding window indicated by bracket 454 contains the string portion "ntel." Because the sliding window slides by two characters, the sliding window never contains the string portion "inte." If the predefined fingerprints 446 only included the predefined fingerprint F(inte), the substring "inte" would not be detected. The computed fingerprint for the string portion "bint," however, would match a predefined fingerprint "F(bint)" for the augmented substring portion "bint." Because "bint" is one of the augmented substring portions (i.e., "*int") created from the substring "inte," a match with the predefined fingerprint "F(bint)" is considered a match with the substring "inte."

In an alternative embodiment, shown in FIG. 6, multiple tables 646a, 646b of predefined fingerprints may include fingerprints of substrings and fingerprints of shortened portions of substrings. The tables 646a, 646b may each store predefined fingerprints of a particular length. The shortened substring portions (e.g., in table 646b) may be used to prevent missing substrings instead of using the augmented substring portions shown in FIG. 5. The tables may include tables of substrings and shortened substring portions decreasing in length from the length W of the fixed window to the length W−S+1. In the illustrated embodiment where the sliding window and substrings have a length (W) of four (4) characters and the slide (S) is two (2) characters, table 646a includes substrings of four characters (e.g., length of W) and table 646b includes shortened substring portions of three characters (e.g., W−S+1 characters). If the slide (S) is three (3) characters, another table may include shortened substring portions of two (2) characters. By using multiple tables of smaller sizes, the predefined fingerprints to be stored for use in substring detection may be further compressed and the memory footprint required by the lookup tables may be further reduced.

During substring detection, computed fingerprints of portions of the input string 440 corresponding to the sliding window may be compared to the tables 646a including predefined fingerprints of the substrings. Predefined fingerprints of one or more subsets of the sliding window may be computed for comparison to the tables 646b including fingerprints of shortened substring portions. The subset(s) of the sliding window includes the corresponding portion of the string without the first one to S−1 characters. In FIG. 4, for example, when the window is in the first position indicated by bracket 450, a fingerprint for the subset "int" is computed and matched to the predefined fingerprint F(int) in table 646b for the shortened portion "int" of the substring "inte." Fingerprinting algorithms known to those skilled in the art allow fingerprints of a subset (e.g., F(int)) of a string portion to be computed by subtraction from the fingerprint computed for the string portion (e.g., F(inte)). Thus, the fingerprints for the subset of the sliding window may be computed with operations of relatively low complexity.

Although the illustrated embodiments show a limited number of patterns of interest and predefined substrings of those patterns, substring detection may be used with other numbers of patterns. In one example, a sliding window of W=8 and S=2 may be used to detect about 500 patterns with a fingerprint table size of about 3.32 KB. This example of substring detection may be capable of eliminating over 80% of the input string that would have otherwise been processed using a multi-pattern matching algorithm.

Sliding windows that slide by more than one character at a time may also be used in substring detection without computing fingerprints. The predefined substrings and portions of the predefined substrings may be stored in the lookup tables without computing fingerprints. The portions of the input strings corresponding to the sliding windows may then be compared directly to the predefined substrings and portions of the predefined substrings.

Figure 7:
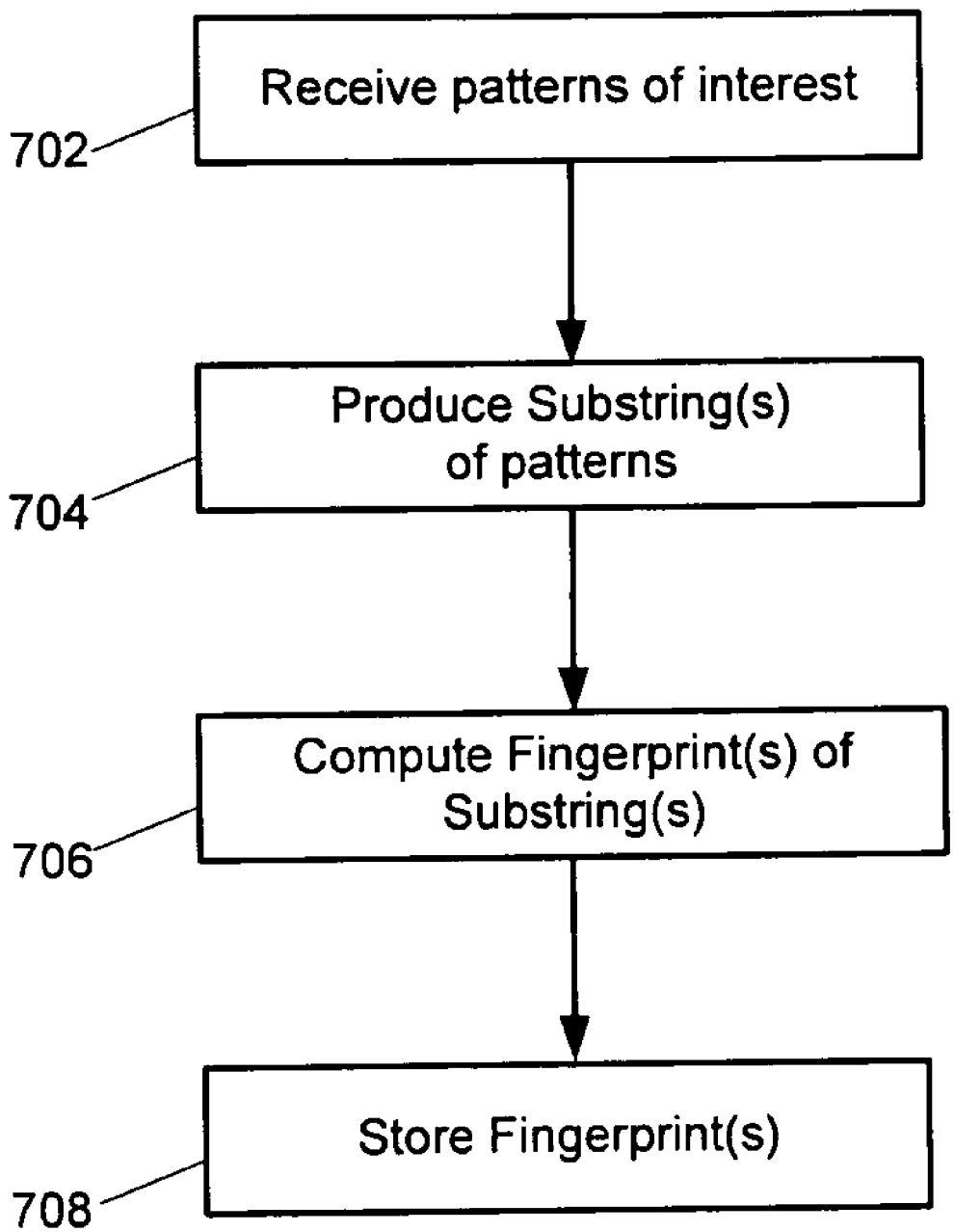
FIG. 7 is a flowchart of one embodiment of a method of composing stored predefined fingerprints for use in substring detection.

Referring to FIG. 7, flowchart 700 illustrates one method of composing predefined fingerprints to be used in substring detection. The operations of this method of composing predefined fingerprints may be executed by security processor 130, substring detector 138, and/or a computer system or other type of instruction executing device. The method of composing predefined fingerprints may include receiving 702 patterns of interest. As shown in FIG. 2 and discussed above, patterns of interest 242 may include a list of terms of interest. The method of composing predefined fingerprints may also include producing 704 substrings of the patterns of interest. As shown in FIG. 2 and discussed above, substrings 244 may include a list of substrings derived from the patterns of interest 242. The substrings may also include substring portions, such as the augmented substring portions or the shortened substring portions described above.

The method of composing predefined fingerprints may also include computing 706 fingerprints for each substring and if applicable, the augmented substring portions and/or the shortened substring portions. As mentioned above, fingerprinting techniques known to those skilled in the art, such as fingerprinting by random polynomials, may be implemented for computing the fingerprints. The method of composing predefined fingerprints may further include storing 708 the predefined fingerprints, for example, in a lookup table. The predefined fingerprints (e.g., lookup tables) may be physically stored on a storage device such as storage device 142 and/or in a memory (e.g., volatile memory, nonvolatile memory, etc.).

Figure 8:
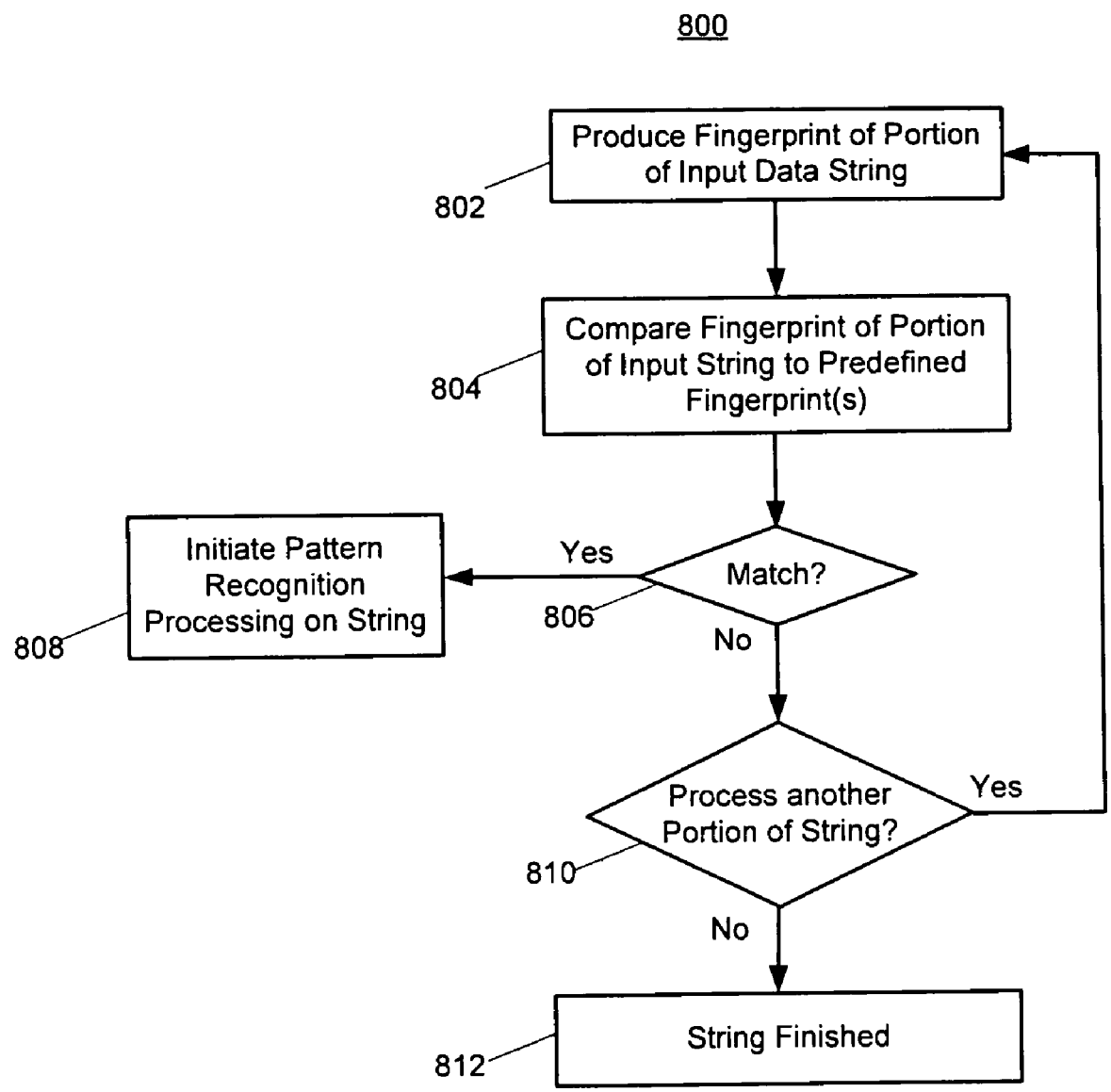
FIG. 8 is a flowchart of one embodiment of a method of detecting substrings in a data string.

Referring to FIG. 8, a flowchart 800 illustrates one method of detecting substrings in a data string. The operations of this method may be executed by security processor 130, substring detector 138, and/or a computer system or other type of instruction executing device. This method of detecting substrings may include producing 802 a fingerprint of a portion of an input data string. For example, the portion of the input string may include the portion corresponding to the location of the sliding window relative to the data packet content (e.g. the four character portion indicated by bracket 352 in FIG. 3). The fingerprint of the portion of the input string may be produced by computing the fingerprint for the portion as described above. Producing the fingerprint of the portion of the input string may also include computing a fingerprint of a subset of the sliding window as described above.

The method of detecting substrings may also include comparing 804 the computed fingerprints with one or more predefined fingerprints. In some embodiments, the predefined fingerprint(s) may include one or more lookup tables of predefined fingerprints. Comparing the fingerprints, a match 806 may be detected that indicates the substring associated with the predefined fingerprint is included in the portion of the input string associated with the computed fingerprint. If a match is detected, the method of detecting substrings may include initiating 808 pattern recognition processing on a data string (e.g., the contents of a data packet) that includes the substring. The pattern recognition processing may include processing using a multi-pattern matching algorithm as described above. After initiating pattern recognition processing, the method may be repeated for another input string or may continue to process subsequent portions of the same input string.

If a match is not detected, the method may include determining 810 if there is another subsequent portion of the input string to be processed. If the method uses a sliding window, for example, the method may determine if the sliding window is able to move (e.g., by one or more characters) to a subsequent location within the input string. If there is a subsequent portion to be processed, the method may then be repeated by producing 802 a fingerprint of the subsequent portion. As illustrated in FIG. 3, for example, a first portion indicated by bracket 352 may include four characters (e.g., "int"). After determining if one or more predefined substrings may be present in the first portion, a four character second portion indicated by bracket 354 that is right shifted by one character (e.g., "ntel") may be examined. If the input string does not contain any further substrings to be processed, the substring detection processing of the string may be finished 812.

One or more of the operations associated with flowchart 700 and/or flowchart 800 may be performed by one or more programmable processors (e.g., a microprocessor, an ASIC, etc.) such as security processor 130 executing a computer program. The execution of one or more computer programs may include operating on input data (e.g., data provided from a memory and/or storage device, etc.) and generating output (e.g., sending data to a computer system, etc.). The operations may also be performed by a processor implemented as special purpose logic circuitry (e.g., an FPGA (field programmable gate array), an ASIC (application-specific integrated circuit), etc.).

Operation execution may also be executed by digital electronic circuitry, or in computer hardware, firmware, software, or in combinations of them. The operations described in flowchart 700 and/or flowchart 800 may be implemented as a computer program product, e.g., a computer program tangibly embodied in an information carrier, e.g., in a machine-readable storage device (e.g., RAM, ROM, hard-drive, CD-ROM, etc.) or in a propagated signal. The computer program product may be executed by or control the operation of, data processing apparatus, e.g., a programmable processor, a computer, or multiple computers. A computer program may be written in one or more forms of programming languages, including compiled or interpreted languages, and it can be deployed in any form, including as a stand-alone program or as a module, component, subroutine, or other unit suitable for use in a computing environment. A computer program may be deployed to be executed on one computing device (e.g., controller, computer system, etc.) or on multiple computing devices (e.g., multiple controllers) at one site or distributed across multiple sites and interconnected by a communication network.

While the substring detection is described above in the context of network protection, other types of data such as DNA sequences may be searched using substring detection. A substring detection method may also be used in any computing device including, but not limited to, desktop computers, laptop computers, handheld devices, and mobile phones. A substring detection method may also be used in other devices, such as a bio-sequence analyzer, that carry out complex pattern matching.

Figure 9:
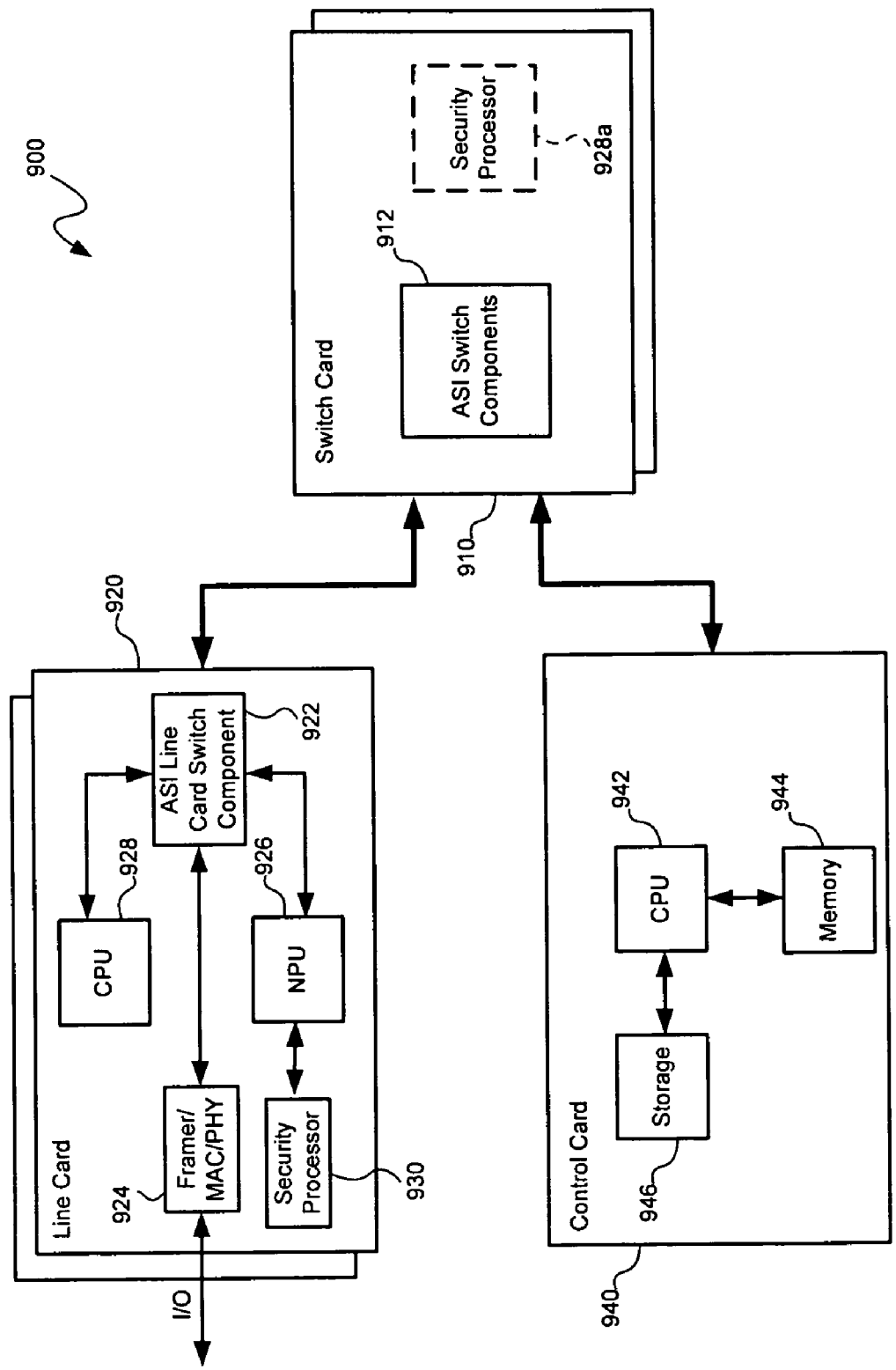
FIG. 9 is a diagrammatic view of one embodiment of a communications system including a security processor capable of substring detection.

Referring to FIG. 9, substring detection, consistent with embodiments of the present invention described above, may be implemented in a communications system 900. The communications system 900 may include one or more switch cards 910, one or more line cards 920, and one or more control cards 940. The switch card(s) 910 may be representative of an Advanced Switching Interconnect (ASI) fabric. The switch card(s) 910 may include ASI switch components 912 that control switching of communications between various line cards 920 of the communication system 900. The switch card(s) 910 may also include other components (not shown), such as a central processing unit (CPU), a memory, and a storage medium, (e.g., a nonvolatile memory device) that stores one or more software components.

The line card(s) 920 may be coupled to switch card 910 via a serial interconnect. The line card(s) 920 may include a local ASI switch component 922 that is linked to local framer/media access control (MAC)/physical layer (PHY) component(s) 924, NPU(s) 926, and/or CPU(s) 928. The framer/MAC/PHY component(s) 924 may be used to connect the line card(s) 920 to other locations via an I/O data link and may also be coupled directly to ASI line card switch component 922, for example, via an ASI link. The line card(s) 920 may also include memory and/or storage components (not shown) coupled to the CPU 928. The line card(s) 920 may further include a security processor 930 capable of supporting the NPU 926 by performing substring detection. The security processor 930 may perform substring detection before further pattern recognition processing performed by security processor 930 or NPU 926. Alternatively or additionally, the switch card(s) 910 may include a security processor 930a to perform the substring detection and/or further pattern recognition.

The control card(s) 940 may include a CPU 942 coupled between a memory 944 and a storage 946. The switch card(s) 910, line card(s) 920 and control card(s) 940 may be implemented in modular systems that employ serial-based interconnect fabrics, such as PCI Express™ components. One example of such modular communication systems includes Advanced Telecommunications Computing Architecture (AdvancedTCA) systems.

Accordingly, an apparatus, consistent with one embodiment, may include an integrated circuit configured to produce a fingerprint of at least one portion of an input data string, to compare the fingerprint of the portion of the data string to at least one predefined fingerprint for a predefined substring, and to initiate pattern recognition processing on the data string if the fingerprints match. The predefined substring includes a portion of a predefined pattern of interest.

A method, consistent with one embodiment, may include receiving at least one portion of an input string of data; producing a fingerprint of the portion of the input string of data; comparing the fingerprint of the portion of the string of data to at least one predefined fingerprint of a predefined substring, wherein the predefined substring includes a portion of at least one predefined string; and if the fingerprints match, initiating pattern recognition on the input string of data.

A system, consistent with a further embodiment, may include a switch fabric configured to route data packets and a plurality of line cards coupled to the switch fabric and configured to receive data packets. At least one of the line cards may include a security processor configured to produce a fingerprint of at least one portion of an input string from at least one of the data packets, to compare the fingerprint of the portion of the data string to at least one predefined fingerprint for a predefined substring, and to initiate pattern recognition processing on the data string if the fingerprints match. The predefined substring includes a portion of a predefined pattern of interest.

Another method consistent with an embodiment of the present invention may include sliding a window of a fixed length across an input string of data to obtain successive portions of the input string of data, wherein the sliding window slides across the input string by more than one character at a time; comparing the portions of the string of data to a plurality of predefined substrings of predefined patterns of interest and to portions of the predefined substrings; and if any one of the portions match, initiating pattern recognition on the input string of data.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method comprising:
   receiving at least one portion of an input string of data;
   producing, using a security processor, a fingerprint of the portion of the input string of data;
   comparing, using the security processor, the fingerprint of the portion of the string of data to at least one predefined fingerprint of at least one predefined substring, wherein the predefined substring includes a portion of at least one predefined pattern of interest, and wherein the predefined pattern of interest is representative of a computer virus; and
   if the fingerprints match, initiating pattern recognition on the input string of data to determine if the input string of data is a computer virus.

2. The method of claim 1 further comprising:
   producing a fingerprint of at least one subsequent portion of the input string of data;
   comparing the fingerprint of the subsequent portion of the input string of data to at least one predefined fingerprint of a predefined substring; and
   if the fingerprints match, initiating pattern recognition on the input string of data.

3. The method of claim 1, further comprising sliding a window of a fixed size across the input string to obtain portions of the input string, the fixed size of the window corresponding to a size of the at least one predefined substring.

4. The method of claim 1, further comprising sliding a window of a fixed size across the input string by more than one character at a time to obtain portions of the input string.

5. The method of claim 4, wherein fingerprints of the portions of the input string are compared with a plurality of predefined fingerprints, and wherein some of the predefined fingerprints include fingerprints of a portion of a substring combined with other characters.

6. The method of claim 4, wherein fingerprints of the portions of the input string are compared with a plurality of predefined fingerprints, and wherein some of the predefined fingerprints include fingerprints of a portion of the at least one predefined substring.

7. The method of claim 1, wherein comparing the fingerprints comprises comparing the fingerprint of the portion of the input string to a table of predefined fingerprints.

8. The method of claim 1, wherein the length of the predefined substring is less than the length of the predefined pattern of interest, and wherein the length of the predefined fingerprint is less than the length of the predefined substring.

9. The method of claim 1, wherein at least one data packet includes the input data string.

10. A system comprising a computer readable storage medium having stored thereon a plurality of instructions that when executed by a processor result in the following operations:
    receiving at least one portion of an input string of data;
    producing a fingerprint of the portion of the input string of data;
    comparing the fingerprint of the portion of the string of data to at least one predefined fingerprint of a predefined substring, wherein the predefined substring includes a portion of at least one predefined pattern of interest, and wherein the predefined pattern of interest is representative of a computer virus; and
    if the fingerprints match, initiating pattern recognition on the input string of data to determine if the input string of data is a computer virus.

11. The system of claim 10, further comprising instructions for sliding a window of a fixed size across the input string to obtain portions of the input string, the fixed size of the window corresponding to a size of the at least one predefined substring.

12. The system of claim 10, further comprising instructions for sliding a window of a fixed size across the input string by more than one character at a time to obtain portions of the input string.

13. An apparatus comprising:
    an integrated circuit configured to produce a fingerprint of at least one portion of an input data string, to compare the fingerprint of the portion of the data string to at least one predefined fingerprint for a predefined substring, and to initiate pattern recognition processing on the data string if the fingerprints match to determine if the input string of data is a computer virus, wherein the predefined substring includes a portion of a predefined pattern of interest and wherein the predefined pattern of interest is representative of a computer virus.

14. The apparatus of claim 13, wherein the integrated circuit is configured to produce a fingerprint of at least one subsequent portion of the input data string, to compare a fingerprint of the subsequent portion of the data string to least one predefined fingerprint for a predefined substring, and to initiate pattern recognition processing on the data string if the fingerprints match.

15. The apparatus of claim 13, wherein the integrated circuit is configured to slide a window of a fixed size across the input string to obtain portions of the input string, the fixed size of the window corresponding to a size of the at least one predefined substring.

16. The apparatus of claim 13, wherein the integrated circuit is configured to slide a window of a fixed size across the input string by more than one character at a time to obtain portions of the input string, the fixed size of the window coffesponding to a size of the at least one predefined substring.

17. The apparatus of claim 16, wherein fingerprints of the portions of the input string are compared with a plurality of predefined fingerprints, and wherein some of the predefined fingerprints include fingerprints of a portion of a substring combined with other characters.

18. The apparatus of claim 16, wherein fingerprints of the portions of the input string are compared with a plurality of predefined fingerprints, and wherein some of the predefined fingerprints include fingerprints of a portion of the at least one predefined substring.

19. The apparatus of claim 13, wherein the integrated circuit is configured to compare the fingerprint to a table of predefined fingerprints associated with a plurality of patterns of interest.

20. A system comprising:
    a switch fabric configured to route data packets; and
    a plurality of line cards coupled to the switch fabric and configured to receive data packets, at least one of the line cards including a security processor configured to produce a fingerprint of at least one portion of an input string from at least one of the data packets, to compare the fingerprint of the portion of the data string to at least one predefined fingerprint for a predefined substring, and to initiate pattern recognition processing on the data string if the fingerprints match to determine if the input string of data is a computer virus, wherein the predefined substring includes a portion of a predefined pattern of interest and wherein the predefined pattern of interest is representative of a computer virus.

21. The system of claim 20, wherein the security processor is configured to slide a window of a fixed size across the input string to obtain portions of the input string, the fixed size of the window corresponding to a size of the at least one predefined substring.

22. The system of claim 20, wherein the integrated circuit is configured to slide a window of a fixed size across the input string by more than one character at a time to obtain portions of the input string, the fixed size of the window corresponding to a size of the at least one predefined sub string.

* * * * *